United States Patent
Kikuchi et al.

(10) Patent No.: US 9,326,640 B2
(45) Date of Patent: May 3, 2016

(54) FOOD PROCESSOR FEED TUBE ASSEMBLY

(71) Applicant: CONAIR CORPORATION, Stamford, CT (US)

(72) Inventors: Lema Kikuchi, New York, NY (US); Mario Turchi, Tenafly, NJ (US)

(73) Assignee: Conair Corporation, Stamford, CT (US)

( * ) Notice: Subject to any disclaimer, the term of this patent is extended or adjusted under 35 U.S.C. 154(b) by 225 days.

(21) Appl. No.: 13/961,290

(22) Filed: Aug. 7, 2013

(65) Prior Publication Data

US 2015/0041578 A1  Feb. 12, 2015

(51) Int. Cl.
A47J 43/07  (2006.01)

(52) U.S. Cl.
CPC ............. *A47J 43/0716* (2013.01); *A47J 43/07* (2013.01)

(58) Field of Classification Search
CPC .................... A47C 43/0716; A47C 43/07
USPC .......................... 241/224, 92, 282.1
See application file for complete search history.

(56) References Cited

U.S. PATENT DOCUMENTS

| | | | | |
|---|---|---|---|---|
| 1,021,757 A * | 4/1912 | Blaisdell | ............... | B65G 11/146 193/20 |
| 4,194,615 A * | 3/1980 | Tell | ............... | B65G 69/181 198/508 |
| 4,226,373 A | 10/1980 | Williams | | |
| 4,544,103 A | 10/1985 | Breeden | | |
| 4,614,306 A * | 9/1986 | Doggett | ............... | A47J 43/046 16/257 |
| 4,778,114 A * | 10/1988 | Panning | ............... | B02C 25/00 251/166 |
| 5,016,686 A * | 5/1991 | Gerstenkorn | ........ | B65G 69/181 141/95 |
| 5,076,504 A * | 12/1991 | Young | ............... | A23N 17/002 241/101.78 |
| 5,190,132 A * | 3/1993 | Stanelle | ............... | B65G 69/182 193/25 E |
| 5,289,909 A | 3/1994 | Maxwell et al. | | |
| 5,372,229 A * | 12/1994 | Leibling | ............... | B65G 11/083 193/25 C |
| 5,620,146 A * | 4/1997 | Lukas | ............... | B02C 19/0087 241/100 |
| 5,628,603 A | 5/1997 | Antalffy et al. | | |
| 5,697,408 A * | 12/1997 | Reeves | ............... | B65G 69/181 141/256 |
| 7,419,110 B2 * | 9/2008 | Irwin | ............... | B02C 18/22 241/224 |
| 7,694,703 B2 * | 4/2010 | Grady | ............... | B22D 41/023 141/256 |
| 7,971,698 B2 | 7/2011 | Burstrom et al. | | |
| 8,074,913 B2 * | 12/2011 | Irwin | ............... | B02C 18/22 241/101.2 |
| 8,146,490 B2 | 4/2012 | Obersteiner et al. | | |
| 8,210,101 B2 * | 7/2012 | Wu Chang | ........ | A47C 43/0788 99/337 |
| 8,262,005 B2 * | 9/2012 | Garcia | ............... | A47J 43/0777 241/282.2 |
| 8,573,523 B2 * | 11/2013 | Buranov | ............... | B24B 19/22 241/246 |
| 9,033,269 B2 * | 5/2015 | Kobos | ............... | A47J 43/07 241/100 |
| 2007/0001044 A1 * | 1/2007 | Irwin | ............... | B02C 18/22 241/224 |
| 2011/0240776 A1 * | 10/2011 | Buranov | ............... | B24B 19/22 241/101.01 |
| 2014/0246529 A1 * | 9/2014 | Kobos | ............... | A47J 43/07 241/100 |
| 2014/0299698 A1 * | 10/2014 | Zakowski | ............... | A47J 44/00 241/100 |

* cited by examiner

*Primary Examiner* — Faye Francis
(74) *Attorney, Agent, or Firm* — Grogan, Tuccillo & Vanderleeden, LLP

(57) ABSTRACT

A food processor feed tube assembly includes a first feed tube extension and a second feed tube extension telescopically and slidably received in the first feed tube extension. The second feed tube extension is configured to be movable from a retracted position in which the second feed tube extension is substantially entirely nested within the first feed tube extension, and an extended position in which the second feed tube extension is extended from the first feed tube extension.

16 Claims, 3 Drawing Sheets

FOOD PROCESSOR FEED TUBE ASSEMBLY

FIELD OF THE INVENTION

The present invention relates to food processors and, more particularly, to a feed tube assembly for a food processor.

BACKGROUND OF THE INVENTION

Food processing devices providing a number of different types of food preparations, such as mixing, grinding, chopping, slicing, grating, shredding, or other processing operations, are well known. Existing food processing devices typically include a base housing an electric motor, a drive shaft driven by the motor, a bowl receivable on the base and a lid or cover having a feed tube releasably mounted to the bowl. A rotatably driven blade is mounted to the drive shaft to process one or more food items inside the bowl.

While existing food processing devices are generally suitable for what is regarded as ordinary performance, there is room for improvement in terms of ease of use and functionality. In particular, a limitation of existing food processing devices is that they are confined to dedicated configurations of feed tube size and shape, requiring larger food items to be manually cut into smaller pieces prior to being inserted into the feed tube.

SUMMARY OF THE INVENTION

It is an object of the present invention to provide a food processor having an extendable feed tube.

It is another object of the present invention to provide a feed tube assembly for a food processor that is capable of handling large food items.

These and other objects are achieved by the present invention.

According to an embodiment of the present invention, a food processor feed tube assembly is provided. The food processor feed tube assembly includes a first feed tube extension and a second feed tube extension telescopically and slidably received in the first feed tube extension. The second feed tube extension is configured to be movable from a retracted position in which the second feed tube extension is substantially entirely nested within the first feed tube extension, and an extended position in which the second feed tube extension is extended from the first feed tube extension.

In another embodiment, a food processor feed tube assembly is provided. The feed tube assembly includes a first member having a substantially annular body, a cover and an opening in the cover, and a second member having a substantially annular body. The second member is telescopically received by the first member through the opening.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
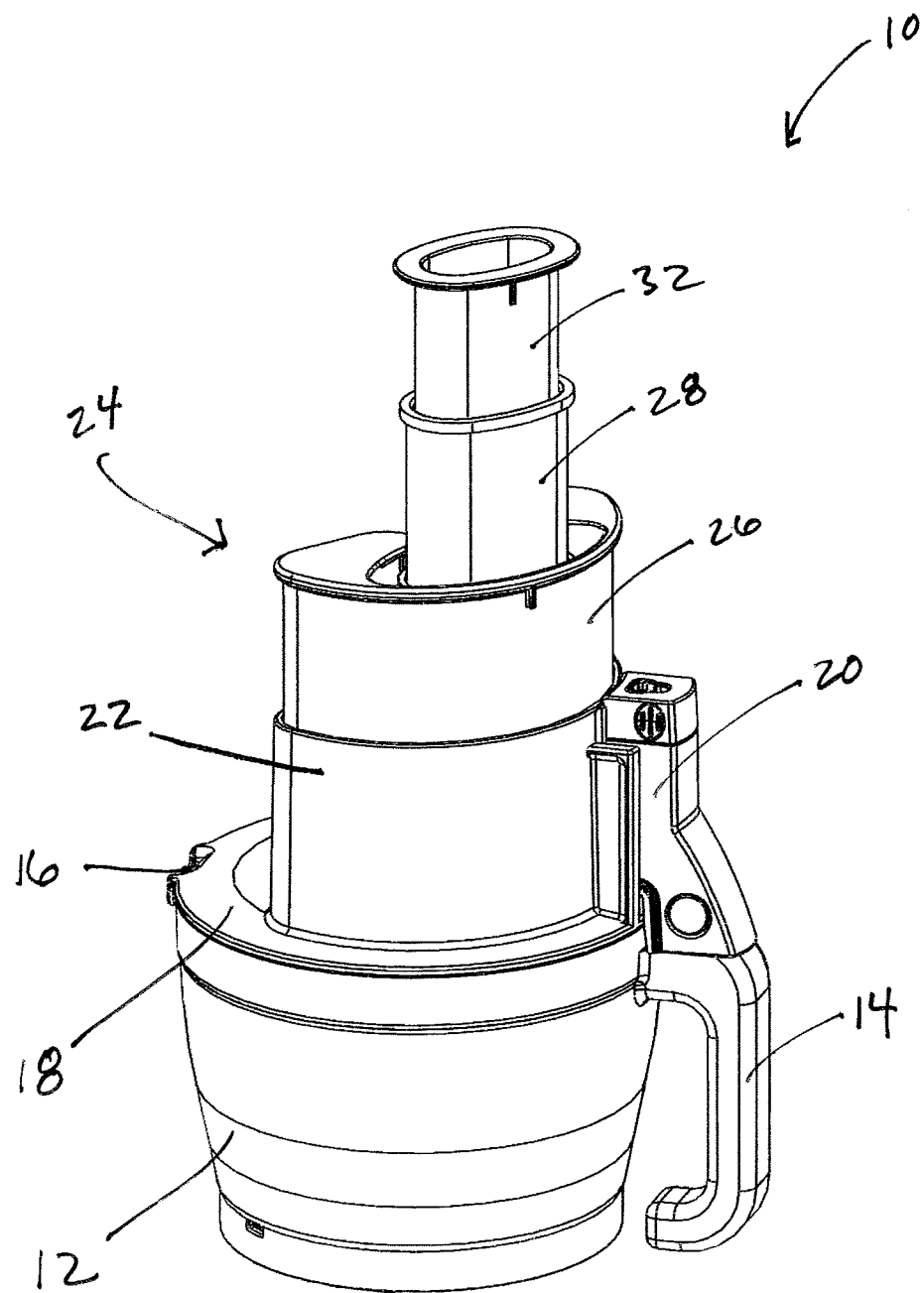
FIG. 1 is a perspective view of a food processor receptacle and cover having a feed tube assembly according to an embodiment of the present invention.

Referring to FIG. 1, a food processor receptacle 10 is shown. The receptacle 10 includes a work bowl 12 that is generally cylindrical or frusto-conical in shape and has a handle 14 and a pour spout 16. A cover 18 is configured to be selectively removable from the bowl 12. The handle 14 may include a locking mechanism 20 configured to prevent the food processor from activating when the receptacle 10 and the base, or receptacle 10 and cover 18 are not properly aligned. Locking mechanisms for food processors are known and may include any of these various means for ensuring proper alignment of the base, receptacle 10 and cover 18.

As best shown in FIG. 1, the cover/lid 18 defines a substantially circular body sized and dimensioned to cover work bowl 12. The cover 18 also includes an internal frame defining a feed tube opening (not shown). The feed tube opening may be generally oval in shape, although other shapes and dimensions are envisioned without departing from the broader aspects of the present invention. Cover 18 may have an integral feed tube 22 defining a substantially annular body having a substantially oval cross-section extending upwards from the cover 18 and in communication with the feed tube opening, as shown therein. As further shown therein, a feed tube assembly 24 is selectively positionable within the feed tube 22, as discussed in detail hereinafter.

Figure 2:
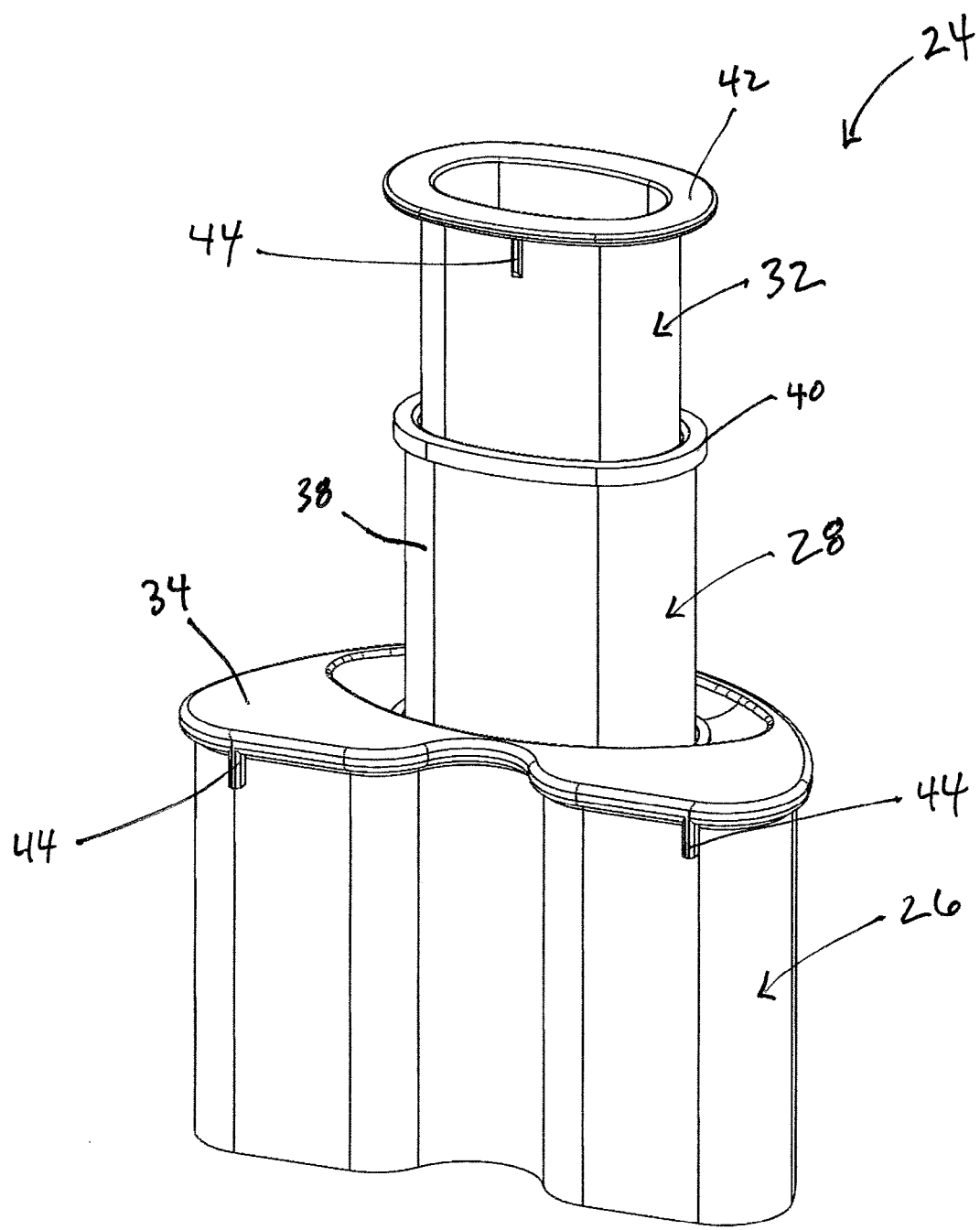
FIG. 2 is a perspective view of a food processor feed tube assembly according to an embodiment of the present invention.
Figure 3:
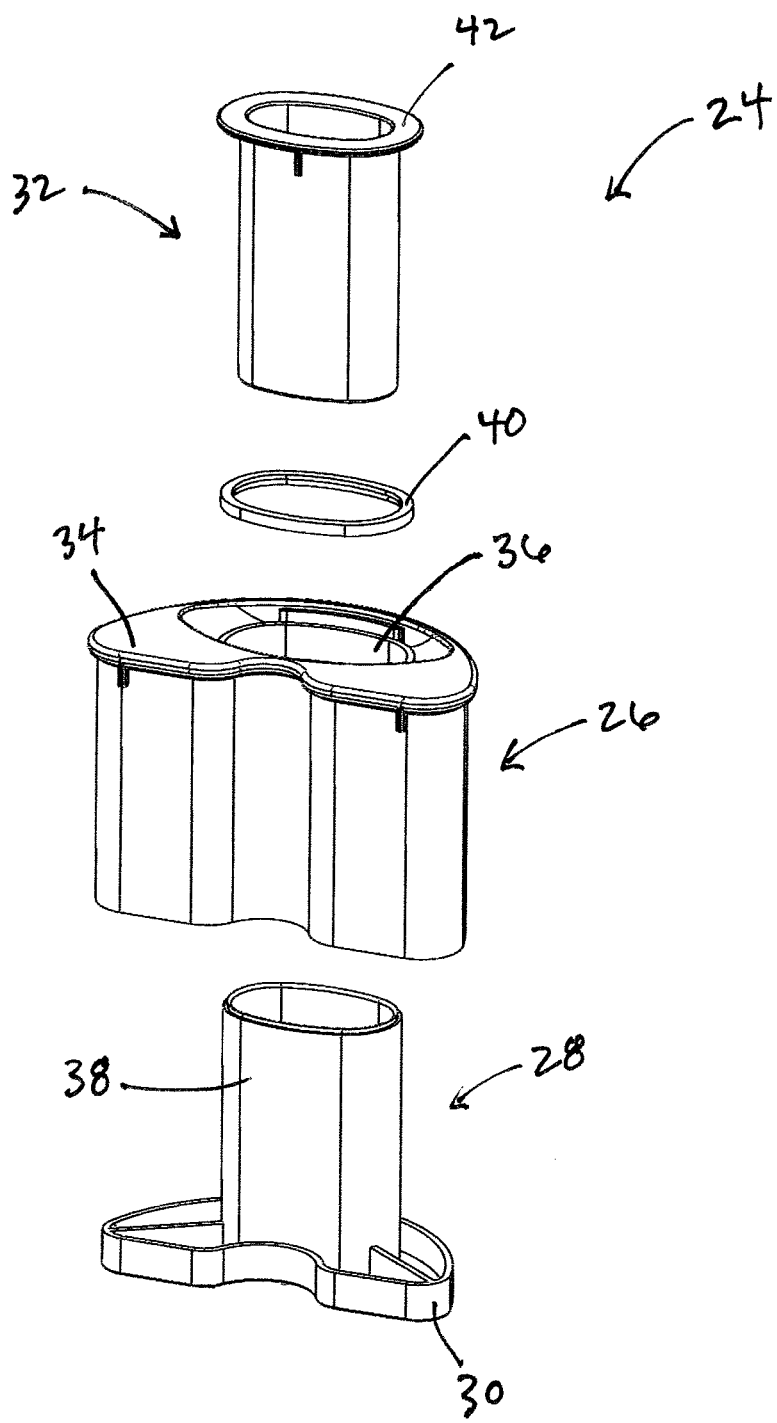
FIG. 3 is an exploded, perspective view of the food processor feed tube assembly of FIG. 2.

Turning now to FIGS. 2 and 3, the feed tube assembly 24 includes a first feed tube extension 26, a second feed tube extension 28 having a main pusher 30, and a secondary pusher 32 that are telescopically received by one another, as discussed in detail hereinafter. The first feed tube extension 26 defines a substantially annular body having a substantially oval cross-section and is dimensioned to be slidably received in feed tube 22, as best shown in FIG. 1. The first feed tube extension 26 also includes a cover 34 having a top opening 36 that is substantially oval in shape.

The second feed tube extension 28 includes a stack 38 defining a substantially annular body having a substantially oval cross-section and is dimensioned to be slidably received in the opening 36 in the first feed tube extension 26. As best shown in FIG. 3, a main pusher 30 is integrally formed with the stack 38. The main pusher 30 has a substantially flat bottom surface and an outer periphery that is dimensioned to be closely and slidably received by the internal walls of the first feed tube extension 26. A retaining ring 40 is configured to fit around the outer periphery of the stack 38 of the second feed tube extension 28 to prevent the second feed tube extension from decoupling from the first feed tube extension 26.

The feed tube assembly 24 also includes a secondary pusher 32 defining a substantially annular body having a substantially oval cross section and a top flange 42. As shown in FIG. 2, the secondary pusher 32 is dimensioned to be slidably received in the stack 38 of the second feed tube extension 28.

The first feed tube extension 26 and secondary pusher 32 may also include one or more position stops 44 for limiting downwards travel of the first feed tube extension and 26 pusher 32 within the feed tube 22 and stack 38, respectively, with which they are nested.

Importantly, the first feed tube extension 26, second feed tube extension 28 and secondary pusher 32 are in nested arrangement such that the feed tube assembly 24 is movable between an extended position, as shown in FIGS. 1 and 2, and a retracted position, in which the pusher 32, second feed tube extension 28 and first feed tube extension 26 are received within, and do not extend substantially above, feed tube 22.

In operation, for smaller food items, a user may collapse the feed tube assembly 24 such that the first feed tube extension 26 and second feed tube extension 28 are substantially nested within the main feed tube 22. A user may then insert the food items into the opening in the second feed tube extension 28 and utilize secondary pusher 32 to urge the food items through the feed tube 22 and into the bowl 12.

For taller food items, such as carrots, celery and the like, the feed tube assembly 24 may first be placed in the fully extended position, as shown in FIGS. 1 and 2. In this position, a user may then insert the tall food items into the opening in the second feed tube extension 28 and utilize the pusher 32 to urge the food items downward. As the food items are fed into the bowl 12 by exerting downwards pressure on the pusher 32, the second feed tube extension 28 is pushed downward until it is in nested position substantially within the first feed tube extension and, subsequently, the first feed tube extension 26 is collapsed until it is in nested position substantially within the feed tube 22. As will be readily appreciated, the ability of the first and second feed tube extensions 26, 28 to collapse from their extended position allows constant downward pressure on the food item. As the final inches of the food items are urged into the bowl, the feed tube assembly 24 assumes its fully collapsed and nested position. In this manner, the feed tube assembly 24 of the present invention is capable of easily and quickly accommodating tall food items to be processed.

In addition to the above, the feed tube assembly 24 of the present invention also facilitates the processing of large food items, such as whole potatoes and the like. In particular, when processing large food items, a user may insert the large food items directly into the wide-mouth main feed tube 22, and utilize the pusher 30 of the second feed tube extension 28 (while the feed tube assembly 24 is in nested/collapsed position) to urge the food item through the feed tube 22 and into the bowl 12 for processing, thus obviating the need to first cut the food item into small pieces which has heretofore been necessary.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A pusher assembly for a food processor, comprising:
a first feed tube extension having a body dimensioned to be slidably received by a feed tube of a lid of said food processor, a cover atop said body, and an aperture formed in said cover;
a main pusher having a substantially planar bottom surface defining a first pusher area and an aperture through said bottom surface, said main pusher also including a stack extending upwardly from said bottom surface and surrounding said aperture, said stack being slidably receivable by said aperture in said cover of said first feed tube extension; and
a secondary pusher having a substantially planar bottom surface defining a second pusher area, said secondary pusher being slidably receivable by said main pusher;
wherein said first feed tube extension being movable between a nested position in which said first feed tube extension is substantially nested within said feed tube of said lid and an extended position in which said first feed tube extension extends substantially above said feed tube of said lid;
wherein said main pusher is movable between a nested position in which said stack is substantially entirely housed within said first feed tube extension and an extended position in which said stack extends substantially above said cover of said first feed tube extension; and
wherein said first pusher area is substantially greater than said second pusher area.

2. The pusher assembly of claim 1, wherein:
said secondary pusher is slidably receivable within said stack of said main pusher; and
said second pusher area substantially corresponds to a cross-sectional area of said stack.

3. The pusher assembly of claim 1, further comprising:
a retaining ring is positioned about said stack at a distal end thereof, said retaining ring being configured to prevent decoupling of said main pusher from said first feed tube extension.

4. The pusher assembly of claim 1, wherein:
said secondary pusher includes an annular flange at a top, distal end thereof, said annular flange being configured to limit an insertion depth of said secondary pusher within said stack of said main pusher.

5. The pusher assembly of claim 1, wherein:
said pusher assembly is selectively movable between a retracted position in which said first feed tube extension, said main pusher including said stack and said secondary pusher are substantially nested and disposed substantially entirely within said feed tube of said lid, and an extended position in which said first feed tube extension is extended from said feed tube of said lid and said stack of said main pusher is extended from said first feed tube extension.

6. The pusher assembly of claim 1, wherein:
said body of said first feed tube extension and said bottom surface of said main pusher are generally crescent-shaped.

7. The pusher assembly of claim 6, wherein:
said secondary pusher and sad stack have a substantially oval cross-section.

8. The pusher assembly of claim 1, wherein:
said first feed tube extension includes at least one position stop for limiting travel of said first feed tube extension relative to said feed tube.

9. A food processor, comprising:
a work bowl;
a lid sized to cover said work bowl, said lid including a feed tube opening and an integral feed tube extending upward from said lid and surrounding said opening; and
a pusher assembly receivable by said feed tube, said pusher assembly including:
a first feed tube extension having a body dimensioned to be slidably received by said feed tube, a cover atop said body, and an aperture formed in said cover;
a main pusher having a substantially planar bottom surface defining a first pusher area and an aperture through said bottom surface, said main pusher also including a stack extending upwardly from said bottom surface and surrounding said aperture, said stack being slidably receivable by said aperture in said cover of said first feed tube extension; and a secondary pusher having a substantially planar bottom surface defining a second pusher area, said secondary pusher being slidably receivable by said main pusher;
wherein said first feed tube extension being movable between a nested position in which said first feed tube extension is substantially nested within said feed tube of said lid and an extended position in which said first feed tube extension extends substantially above said feed tube of said lid;
wherein said main pusher is movable between a nested position in which said stack is substantially entirely housed within said first feed tube extension and an extended position in which said stack extends substantially above said cover of said first feed tube extension; and
wherein said first pusher area is substantially greater than said second pusher area.

10. The food processor of claim 9, wherein:
said secondary pusher is slidably receivable within said stack of said main pusher; and
said second pusher area substantially corresponds to a cross-sectional area of said stack.

11. The food processor of claim 9, further comprising:
a retaining ring is positioned about said stack at a distal end thereof, said retaining ring being configured to prevent decoupling of said main pusher from said first feed tube extension.

12. The food processor of claim 9, wherein:
said secondary pusher includes an annular flange at a top, distal end thereof, said annular flange being configured to limit an insertion depth of said secondary pusher within said stack of said main pusher.

13. The food processor of claim 9, wherein:
said pusher assembly is selectively movable between a retracted position in which said first feed tube extension, said main pusher including said stack and said secondary pusher are substantially nested and disposed substantially entirely within said feed tube of said lid, and an extended position in which said first feed tube extension is extended from said feed tube of said lid and said stack of said main pusher is extended from said first feed tube extension.

14. The food processor of claim 9, wherein:
said body of said first feed tube extension and said bottom surface of said main pusher are generally crescent-shaped.

15. The food processor of claim 14, wherein:
said secondary pusher and sad stack have a substantially oval cross-section.

16. The food processor of claim 9, wherein:
said first feed tube extension includes at least one position stop for limiting travel of said first feed tube extension relative to said feed tube.

* * * * *